3,324,002
ANTI-INFLAMMATORY PREPARATIONS CONTAINING PROTEOLYTIC ENZYMES AND ADRENAL GLUCOCORTICOIDS

Harold J. Antonides, Kankakee, Ill., assignor to Armour Pharmaceutical Company, Chicago, Ill., a corporation of Delaware
No Drawing. Filed Sept. 17, 1962, Ser. No. 224,224
9 Claims. (Cl. 167—73)

This invention relates to anti-inflammatory preparations, to the treatment of human beings for the alleviation of inflammatory conditions, and more particularly to praparations suitable for systemic anti-inflammatory ormucolytic effect, and to treatment therewith by absorption from the digestive tract, by parenteral administration, and also by rectal or vaginal administration.

The use of steroids to produce systemic anti-inflammatory effects has been very beneficial, but at the same time has been accompanied by side effects which often are very serious. By way of example, the oral use of cortico steroids for absorption from the digestive tract to produce systemic anti-inflammatory effects has resulted in an insufficiency of adrenal output at times of stress, such as, surgery, etc., and has been followed by serious consequences. If it were possible to reduce the level of steroids so as to avoid side effects while at the same time maintaining the desired anti-inflammatory, etc., effects, a substantial advance would be made.

I have discovered that the use of enzymes in combination with steroids enables the steroids to be employed at a reduced level, while the combined anti-inflammatory effect is maintained at the desired level and with the substantial absence of side effects. By way of illustration, an oral preparation in tablet form comprising 1.25 mg. of prednisolone and an enzyme having a proteolytic activity of 50,000 AU, and administered at a dosage of two tablets four times daily (10 mg. prednisolone total daily), was found to be the equivalent of 20 to 30 mg. of prednisolone per day in anti-inflammatory effect.

An object of the invention is to provide a preparation containing enzyme and steroid materials effective for systemic or local anti-inflammatory activity. A further object is to provide a preparation which may be administered by absorption from the digestive tract, by parenteral adminstration, and by rectal or vaginal administration. A further object is to provide in addition to the systemic anti-inflammatory activity, a systemic mucolytic activity of especial value in the sinuses and bronchia. A further object is to provide for the treatment of inflammatory conditions through the administration of formulations consisting essentially of enzyme and steroid substances in combination with a base or vehicle. These and still other specific objects and advantages as shall appear as the specification proceeds are fulfilled by the present invention in a remarkably unexpected fashion as shall be discerned from the following detailed description of exemplary embodiments of this invention.

In one embodiment of the invention, a steroid material is combined with an anti-inflammatory enzyme and the preparation administered to a human being for systemic anti-inflammatory activity or systemic mucolytic activity. The preparation may be in the form of a composition or tablet or capsule, with or without an enteric coating or other gastric-resistant mechanism. The steroid and enzyme material may be carried in a suitable vehicle, such as an oil or aqueous vehicle, for parenteral administration. For rectal or vaginal aministration, a suppository is preferred. The effect in the sinuses is a result of the systemic action, as, for example, by utilization from the gastro-intestinal tract.

Any anti-inflammatory enzyme material may be employed, such as those derived from animal, plant, and bacterial sources. Examples of the enzymes of animal origin are the pancreatic enzymes, including trypsin, chymotrypsin, etc., collagenase, etc. Examples of enzymes dedrived from plants are papain, bromelin, and ficin. Proteases are examples of suitable enzymes from both animal and plant origin. Examples of bacterial enzymes are streptokinase, streptodornase, etc. I prefer to employ trypsin, chymotrypsin, or combinations thereof.

Anti-inflammatory steroid substances, their qualities, characteristics, uses, and dosages are well known. Examples of such are cortisone, hydrocortisone, hydrocortamate, prednisone, prednisolone, triamcinolone, dexamethasone, methyl prednisolone, paramethasone, betamethasone, and fluorocortisone.

Since the use of the foregoing steroids is well known and the dosages employed on a daily basis are well understood, it will be sufficient to indicate ranges of potencies of the enzyme component of the preparation for use with such common dosages. As previously indicated, it is possible when using my invention to obtain the same response while using a significantly reduced amount of steroid. The range of potencies of the enzyme component is not critical and may vary widely. For example, the range of potencies of the enzyme component may vary from 1,000 AU to 250,000 AU per tablet or other dose of the preparation consisting of the steroid and the enzyme. Preferably, the range of potencies of the enzyme component is from 10,000 AU to 100,000 AU. The term "AU" or "Armour Unit" is obtained by a modification of the Anson hemoglobin method. One Armour Unit of proteolytic activity is that amount which, upon incubation with the hemoglobin substrate, as directed in the method of assay, will release a quantity of phenolic substances which when reacted with Folin-Ciocalteau Phenol Reagent, will result in the formation of a colored solution of equal intensity to that produced from the reaction of one microgram of tyrosine with Folin-Ciocalteau Phenol Reagent.

The enzyme and steroid may be prepared as a tablet, and preferably with a base or carrier material. The carrier may comprise a readily-soluble base consisting of, for example, magnesium stearate, sorbitol, and mannitol. Other carriers or bases may consist of lactose and magnesium stearate, lactose and polyethylene glycol, or other suitable base material employed for tablet components, such as dicalcium phosphate, starch, sugar, acacia, gelatin, etc.

The enzyme and steroid may also be employed in a preparation which consists essentially of a suspension of the enzyme and the steroid in a vegetable oil or inert vehicle enclosed within a suitable capsule such for example as gelatin.

In the use of the pancreatic enzymes trypsin and chymotrypsin, these enzymes may be used alone or in combination, either as relatively crude or as purified forms, and the formulation of the enzyme with the steroid may be prepared as compressed tablets, with or without enteric properties, for ingestion in the digestive tract. The trypsin and chymotrypsin may be present in various ratios and varying in purity from pancreatin to crystallized enzymes. The enzyme and steroid may be formed with a non-hygroscopic carrier in a compressed tablet to provide a tablet in which the proteolytic activity and the other components are stable. The tablets may be prepared by simple milling, slugging, granulating, and compressing. Dry processing is preferred because of increased stability in the final product. If desired, an enteric coating, preferably of cellulose acetate phthalate, may be applied to the tablets, with or without a final sugar coating to provide a product for oral ingestion.

If desired, gastric resistant granules of the enzymes and other components may be prepared for compression into tablets which will not require enteric coating. If desired, the composition may also be enclosed in gelatin or other capsules.

To aid in a more complete understanding of the present invention, and not by way of limitation, the following specific examples of illustrative formulations and applications are presented, the quantities being mentioned on a per tablet or per capsule basis:

Example I

Enteric coated compressed tablets were prepared for oral administration using convention techniques, and had the following composition:

| | | |
|---|---|---|
| Trypsin and/or chymotrypsin | AU | 50,000 |
| Prednisolone | mg | 1.25 |
| Magnesium stearate | mg | 1.0 |
| Polyethylene glycol 4000 | mg | 5.0 |
| Sorbitol | mg | 50.0 |
| Mannitol (q.s.) | mg | 120.0 |

Enteric coating, e.g., cellulose acetate phthalate.

Example II

Enteric compressed tablets were prepared for oral administration using known techniques, and had the following composition:

| | | |
|---|---|---|
| Gastric resistant trypsin and/or chymotrypsin granules | AU | 50,000 |
| Prednisolone | mg | 1.25 |
| Magnesium stearate | mg | 2.0 |
| Lactose, to make | mg | 200.0 |

Example III

Enteric capsules were prepared for oral administration using known techniques by which the composition of Example II was encapsulated in gelatin capsules.

The trypsin and chymotrypsin may be present in various total potencies and ratios and varying in purity from pancreatin to crystallized enzymes. The use of the polyethylene glycol 4000, magnesium stearate, sorbitol, and mannitol in the compressed tablet formula provides a readily soluble base which can carry a high percentage of therapeutic material, such as pancreatin and steroid, yet process into tablets without difficulty.

Example IV

A dosage for oral administration was prepared by known techniques and had the following composition:

| | | |
|---|---|---|
| Trypsin and/or chymotrypsin | AU | 50,000 |
| Hydrocortisone | mg | 2.5 |
| Magnesium stearate | mg | 2.0 |
| Lactose (q.s.) | mg | 200.0 |

Example V

A dosage for oral administration was prepared by known techniques and had the following composition:

| | | |
|---|---|---|
| Trypsin and/or chymotrypsin | AU | 50,000 |
| Cortisone | mg | 5.0 |
| Polyethylene glycol | mg | 10.0 |
| Magnesium stearate | mg | 2.0 |
| Lactose (q.s.) | mg | 200.0 |

Example VI

A dosage for oral administration was prepared by known techniques and had the following composition:

| | | |
|---|---|---|
| Trypsin and/or chymotrypsin | AU | 50,000 |
| Hydrocortisone | mg | 2.5 |
| Polyethylene glycol | mg | 10.0 |
| Magnesium stearate | mg | 2.0 |
| Mannitol (q.s.) | mg | 200.0 |

Example VII

A dosage for oral administration was prepared by known techniques and had the following composition:

| | | |
|---|---|---|
| Trypsin and/or chymotrypsin | AU | 50,000 |
| Cortisone | mg | 5.0 |
| Magnesium stearate | mg | 10.0 |
| Mannitol (q.s.) | mg | 200.0 |

Example VIII

The following table summarizes clinical results with respect to anti-inflammatory activity results obtained from oral administration of the formulation of Example I to 128 patients:

| Diagnosis | Number Patients | Results | | | | | | | |
|---|---|---|---|---|---|---|---|---|---|
| | | Excellent | Percent | Good | Percent | Fair | Percent | Poor | Percent |
| Abscess | 1 | 1 | 100 | 0 | | 0 | | 0 | |
| Arthritis, osteo | 23 | 19 | 83 | 4 | 17 | 0 | | 0 | |
| Arthritis, traumatic | 9 | 3 | 33 | 4 | 44 | 1 | 11 | 1 | 11 |
| Asthma | 9 | 6 | 67 | 3 | 33 | 0 | | 0 | |
| Bursitis | 19 | 13 | 68 | 6 | 32 | 0 | | 0 | |
| Cellulitis | 14 | 14 | 100 | 0 | | 0 | | 0 | |
| Eczema | 15 | 12 | 80 | 3 | 20 | 0 | | 0 | |
| Ophthalmology | 12 | 5 | 42 | 5 | 42 | 1 | 8 | 1 | 8 |
| Thrombophlebitis | 4 | 2 | 50 | 2 | 50 | 0 | | 0 | |
| Trauma and Contusion | 16 | 12 | 75 | 4 | 25 | 0 | | 0 | |
| Ulcerative Colitis | 5 | 4 | 80 | 1 | 20 | 0 | | 0 | |
| Urticaria | 1 | 1 | 100 | 0 | | 0 | | 0 | |
| Totals | 128 | 92 | 72 | 32 | 25 | 2 | 1.5 | 2 | 1.5 |

The dosage schedule employed (in all but 17 cases) was two tablets four times daily providing only 10 mg. of prednisolone per day.

In summarizing the above data, if one totals the "excellent" and "good" responses, we see that this form of therapy has been highly effective in 97% of the cases reported.

Example IX

For parenteral administration, the following formulation is suitable:

| | | |
|---|---|---|
| Chymotrypsin and/or trypsin crystallized | AU | 5,000 |
| Hydrocortisone phosphate | mg | 10.0 |
| Aluminum monostearate | w./v. | 1% |
| Propylparaben | w./v. | 0.1% |
| Methylparaben | w./v. | 0.02% |
| Sesame oil (q.s.) | ml | 1 |

Dose: 0.5–1 ml. intramuscular once daily.

Example X

For oral administration, tablets of the following formulation are suitable:

| | | |
|---|---|---|
| Trypsin and/or chymotrypsin | AU | 10.000 |
| Hydrocortisone | mg | 2.5 |
| Magnesium stearate | mg | 1.0 |
| Lactose (q.s.) | mg | 100 |

Example XI

For rectal or vaginal administration, the following formulation is employed on a per suppository basis:

| | | |
|---|---|---|
| Chymotrypsin and/or trypsin | AU | 10,000 |
| Hydrocortamate | mg | 1.25 |
| Polyethylene glycol 600 | percent | 20 |
| Polyethylene glycol 4000 | do | 80 |

Out of 16 cases in which the above formulation was employed, the results in 14 cases or 87.5% were good and excellent for the treatment of hemorrhoids, piles, and proctitis. With respect to the two cases where the results were fair and poor, the conditions were such that the product would not be expected to produce good results. The over-all result was a reduction of edema, inflammation, and pain.

While, in the foregoing specification, I have set out specific procedure in considerable detail for the purpose of illustrating embodiments of the invention, it will be understood that such detail or details may be varied widely by those skilled in the art without departing from the spirit of my invention.

I claim:

1. An anti-inflammatory preparation consisting essentially of a protelytic enzyme, selected from the group consisting of orally administrable trypsin, chymotrypsin and combinations thereof, and an orally administrable adrenal glucocorticoid selected from the group consisting of cortisone, hydrocortisone, prednisone and prednisolone.

2. A therapeutic preparation consisting essentially of an enzymene selected from the group consisting of trypsin, chymotrypsin, and combinations thereof; a steroid selected from the group consisting of cortisone, hydrocortisone, prednisone and prednisolone; and a pharmaceutically acceptable excipient.

3. An anti-inflammatory preparation according to claim 1 in which a supra normal response is obtained from a normal dose of said adrenal glucocorticoid when said enzyme has an activity of 1,000 to 250,000 Armour Units.

4. The preparation of claim 3 in which said enzyme has an activity of 10,000 to 100,000 Armour Units.

5. An anti-inflammatory preparation characterized by obtaining substantially the response of a normal dose of steroid acting alone, said preparation consisting of less than a normal dose of steroid and a proteolytic enzyme substance having an activity of 1,000 to 250,000 Armour Units, said steriod being cortisone, hydrocortisone, prednisone or prednisolone and said enzyme being trypsin, chymotrypsin or combinations thereof.

6. A medicinal dosage form containing a proteolytic enzyme selected from the group consisting of trypsin, chymotrypsin or combinations thereof, an adrenal glucocorticoid selected from the group consisting of cortisone, hydrocortisone, prednisone and prednisolone, and a pharmaceutically acceptable excipient.

7. A medical dosage form according to claim 6 in which said glucocorticoid is prednisolone and said enzyme has an activity of about 10,000 to 100,000 Armour Units.

8. In the treatment of human beings for the alleviation of inflammatory conditions, the step of administering orally, to said human beings having such inflammatory condition, a normal dose for such condition of adrenal glucocorticoid selected from the group consisting of cortisone, hydrocortisone, prednisone and prednisolone; and a proteolytic enzyme, selected from the group consisting of trypsin, chymotrypsin and combinations thereof, having an activity of about 10,000 to 250,000 Armour Units.

9. In the treatment of human beings for the alleviation of inflammatory conditions while substantially avoiding steroid side effects, the step of administering orally, to said human beings having such inflammatory conditions, less than a normal dose, for such conditions, of adrenal glucocorticoid selected from the group consisting of cortisone, hydrocortisone, prednisone, and prednisolone; and a proteolytic enzyme selected from the group consisting of trypsin, chymotrypsin and combinations thereof having an activity of from 1,000 to 250,000 Armour Units whereupon the response expected from a normal does of steroid is obtained.

References Cited

UNITED STATES PATENTS

| | | | |
|---|---|---|---|
| 3,019,167 | 1/1962 | Innerfield | 167—73 |
| 3,050,445 | 8/1962 | Damaskus et al. | |
| 3,051,627 | 8/1962 | Bradford et al. | 167—73 X |
| 3,053,737 | 9/1962 | Johnson | 167—77 |
| 3,073,743 | 1/1963 | Spero | 167—77 X |

FOREIGN PATENTS 817,329   7/1959   Great Britain.

OTHER REFERENCES

Chem, Eng. News, 36(26), pp. 42–43, June 30, 1958.

Lesser: Drug & Cosmetic Industry, 71(2), pp. 178, 179, 250–254, Aug. 6, 1952.

Levine et al.: Antibiotic Med. & Clin. Ther., 6(11), pp. 645–647, November 1959.

Remington's Practice of Pharmacy, 11th Ed., 1956, p. 696.

Since News Letter, July 20, 1957, 72(3), p. 59.

Walker; J. Am. Podiat. Assn. 51, pp. 25–31, January 1961. Page S–603, col. 2, vol. 2, Part II, sub. index, 1961.

SAM ROSEN, *Primary Examiner.*

FRANK CACCIAPAGLIA, Jr., JULIAN S, LEVITT,
*Examiners.*

LEROY B. RANDALL, *Assistant Examiner.*